(12) United States Patent
Bischoff et al.

(10) Patent No.: US 6,477,456 B1
(45) Date of Patent: Nov. 5, 2002

(54) CONTROL METHOD AND MODULE FOR OCCUPANT PROTECTION SYSTEMS WITH AN ACTION TO PREVENT PREMATURE TRIGGERING

(75) Inventors: Michael Bischoff, Adelschlag (DE); Johannes Rinkens, Ingolstadt (DE); Stefan Schaeffer, Schrobenhausen (DE); Guenter Fendt, Schrobenhausen (DE); Werner Nitschke, Ditzingen (DE); Otto Karl, Leonberg (DE); Joachim Bauer, Oberstenfeld (DE)

(73) Assignees: Temic Telefunken microelectronic GmbH, Heilbronn (DE); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/647,288

(22) PCT Filed: Mar. 6, 1999

(86) PCT No.: PCT/EP99/01459

§ 371 (c)(1),
(2), (4) Date: Sep. 27, 2000

(87) PCT Pub. No.: WO99/50105

PCT Pub. Date: Oct. 7, 1999

(30) Foreign Application Priority Data

Mar. 28, 1998 (DE) .......................................... 198 13 953

(51) Int. Cl.$^7$ ............................................. B60R 22/00
(52) U.S. Cl. ........................................................ 701/45
(58) Field of Search ............................. 701/45, 29, 31, 701/32, 33; 280/734, 735; 307/10.1

(56) References Cited

U.S. PATENT DOCUMENTS

| | | | |
|---|---|---|---|
| 5,357,141 A | | 10/1994 | Nitschke et al. ............ 307/10.1 |
| 5,899,949 A | * | 5/1999 | Kincaid ......................... 701/45 |
| 5,964,816 A | * | 10/1999 | Kincaid ......................... 701/45 |
| 6,070,687 A | * | 6/2000 | Wallace et al. .............. 180/287 |
| 6,088,639 A | * | 7/2000 | Fayyad et al. ................. 701/45 |
| 6,209,674 B1 | * | 4/2001 | Buhring ....................... 180/282 |
| 6,224,095 B1 | * | 5/2001 | Schifflechner et al. ...... 280/735 |

FOREIGN PATENT DOCUMENTS

| | | |
|---|---|---|
| DE | 4315494 | 9/1994 |
| DE | 19619117 | 11/1997 |
| DE | 19646387 | 5/1998 |
| WO | WO97/23369 | 7/1997 |

OTHER PUBLICATIONS

"CAN—Serielle Datenübertragung für Echtzeitanforderungen", in: *Elektronik* May, 1991, pp. 76–78.

* cited by examiner

Primary Examiner—Jacques H. Louis-Jacques
Assistant Examiner—Brian J Broadhead
(74) Attorney, Agent, or Firm—W. F. Fasse; W. G. Fasse

(57) ABSTRACT

An unintended triggering of a safety device, such as an airbag in an occupant protection system, especially in motor vehicles is prevented by storing already during manufacturing of the module or modules, a blocking information in a memory location of the module or modules. The blocking information is preferably temporarily stored in place of a rated information, which is then overwritten when the module has been installed in the protection system for activating the system. In addition, the module is protected against electromagnetic and/or electrostatic disturbances at the input to the bus system.

7 Claims, 2 Drawing Sheets

CONTROL METHOD AND MODULE FOR OCCUPANT PROTECTION SYSTEMS WITH AN ACTION TO PREVENT PREMATURE TRIGGERING

FIELD OF THE INVENTION

The invention relates to a control method and a respective module for occupant protection systems, especially in motor vehicles, with a central unit and a plurality of modules interconnected by a bus system.

BACKGROUND INFORMATION

Such a control method is disclosed especially in the non-prepublished German Patent Application DE 196 46 387, but is also fundamentally disclosed, for example, in an article by Zimmermann; "CAN-Serial Data Transmission for Real Time Demand", in: *Elektronik* 5/1991, pages 76–78.

It has turned out to be a disadvantage that, before a rated information is allocated, the modules can contain a quasi undefined random information in the cells or memory locations required for storing information in a module. If an actual information is received by such a module that has not yet been provided with a rated information, then it can happen that the comparison between the actual information and the random information satisfies the relationship predetermined for triggering, and triggering occurs. Also, disturbances caused by electromagnetic fields (EMV) or electrostatic charging (ESD) can generate signals at the input of the module that correspond quasi to such an actual information and lead to a triggering and deployment for example of a protection device such as an airbag. In addition to substantial costs for the repair and/or replacement of a module that has been falsely triggered, personnel responsible for assembling such modules may also possibly be exposed to untenable safety risks, especially from pyrotechnically triggered modules (airbags, belt tensioners, etc.).

Furthermore, German Patent Publication 43 15 494 C1 discloses an arrangement and a method for programming at least one motor vehicle control device in which at least one of the control devices is continuously supplied with power, even when the vehicle is not operating, and has a memory for vehicle configuration data. The at least one device deletes its memory when the device is removed from the vehicle, but nevertheless, has a resistant programmed program by means of which it can determine an electronic "non-programmed tag" or as such can determine that the memory is empty. The tag or empty fact can be used as a criterion for independently calling up the required vehicle configuration data from a central control unit. Even such a method cannot ensure that interference signals on the bus system will not lead to a premature triggering of an occupant protection device.

SUMMARY OF THE INVENTION

Therefore it is an object of the invention to provide a control method and a module by means of which the described disadvantages of the prior art, such as the premature triggering of a safety device, are avoided.

This object has been achieved by the present method for preventing a premature, accidental triggering of at least one module (3) including at least one memory location in an occupant protection system for a motor vehicle, said method comprising the following steps:

a) first entering a blocking information into said at least one memory location for preventing triggering of said at least one module until said occupant protection system has been installed in said motor vehicle, b) installing said occupant protection system in said motor vehicle, and c) second entering a rated information into said at least one memory location thereby cancelling said blocking information, whereby the same memory location is used first for temporarily storing said blocking information and then for storing said rated information after said installation is completed.

Due to the entry of the blocking information, premature or accidental triggering of modules not yet provided with a rated information is effectively prevented. The use of the same memory location for blocking information and for rated information makes possible a particularly simple activation and a low requirement for components.

It is particularly advantageous if the module or modules to be installed in a safety system is automatically set by the blocking information during manufacturing of the module or modules. All modules thus contain the blocking information during transport and during assembly. The modules are thus initially activated only after installation in the passenger protections system.

DETAILED DESCRIPTION OF PREFERRED EXAMPLE EMBODIMENTS AND OF THE BEST MODE OF THE INVENTION

Figure 1:
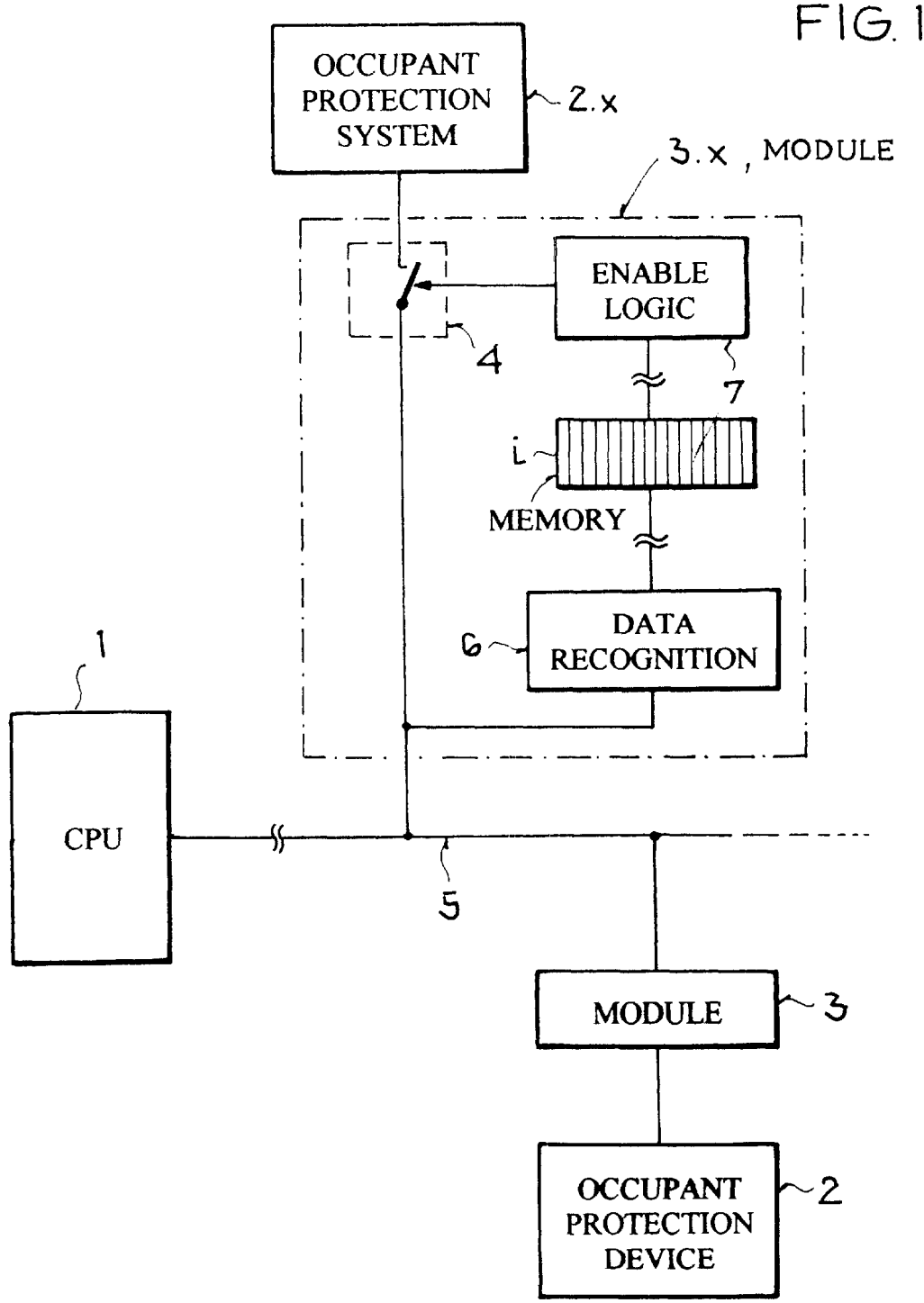
FIG. 1 is a block diagram of a safety system.

FIG. 1 shows a block diagram of an occupant protection system comprising a central unit 1. A plurality of modules 3 of occupant protection devices 2 is connected by at least one bus line 5 to the central unit 1. Here, the module 3.x with the address x is shown in detail by way of example. The blocking information or the rated information is stored in a memory or field i. The address of the module could now be looked upon as a specified or rated information, whereby the non-addressed modules are then, according to the invention, blocked against triggering. In the present example, however, a further embodiment is to be described in more detail, wherein in addition to the address, a rated information different from the address information is to be stored in a memory location of a module.

The rated information is a threshold value that acts as a trigger threshold relative to the actual information sensed by a sensor, whereby the rated information is a real value, for example, a digital value of a safety relevant measured value, for example, the acceleration or an accident category derived therefrom.

During the manufacturing of the module 3.x, the blocking information is automatically allocated to the memory location or field i. The blocking information, for example, consists of an n-bit code word that has been generally agreed upon for the safety system. Depending on the content of field i, the enable logic 7 will therefore block the disable or enable arrangement 4.x of the module 3.x until the central processing unit 1 sends a rated information to a data recognition element 6 of the module 3.x. Thus, prior to the entry of the rated information, triggering is not possible.

The disable or enable arrangement 4 is enabled and the module 3.x and/or the occupant protection device 2.x arranged downstream of the module becomes triggerable only after the rated information in the field i sent to the module 3.x in the course of activating the safety system, is recognized by the data recognition 6 on the bus system 5, and is stored in the field i. The rated information can be, for example, an n-bit code word that differs from the blocking information and serves as a threshold value of a certain accident category or of a certain acceleration value, or simply as an address.

Triggering occurs then, when, for example, the central processing unit 1 sends an actual information, representing for example an acceleration value or an accident category, that is in a predetermined relationship, for example, is identical to or greater than, the rated information stored in the module 3.x, that is, the threshold value. The enable logic 7 executes, for example, a bitwise logic AND-operation between the rated information and the actual information and triggers when they coincide. The module is then triggered. Thus, for example, the igniter of an occupant protection device (airbag, etc.) is ignited. If the blocking information is stored in a field other than the field i, then the release is enabled by a logical negation instead of the overwriting by the rated information. If no rated information is stored and an actual information suitable for triggering nevertheless occurs on the bus system 5, triggering is not possible according to the invention whereby unintended triggering prior to installation of a safety system is avoided.

Figure 2:
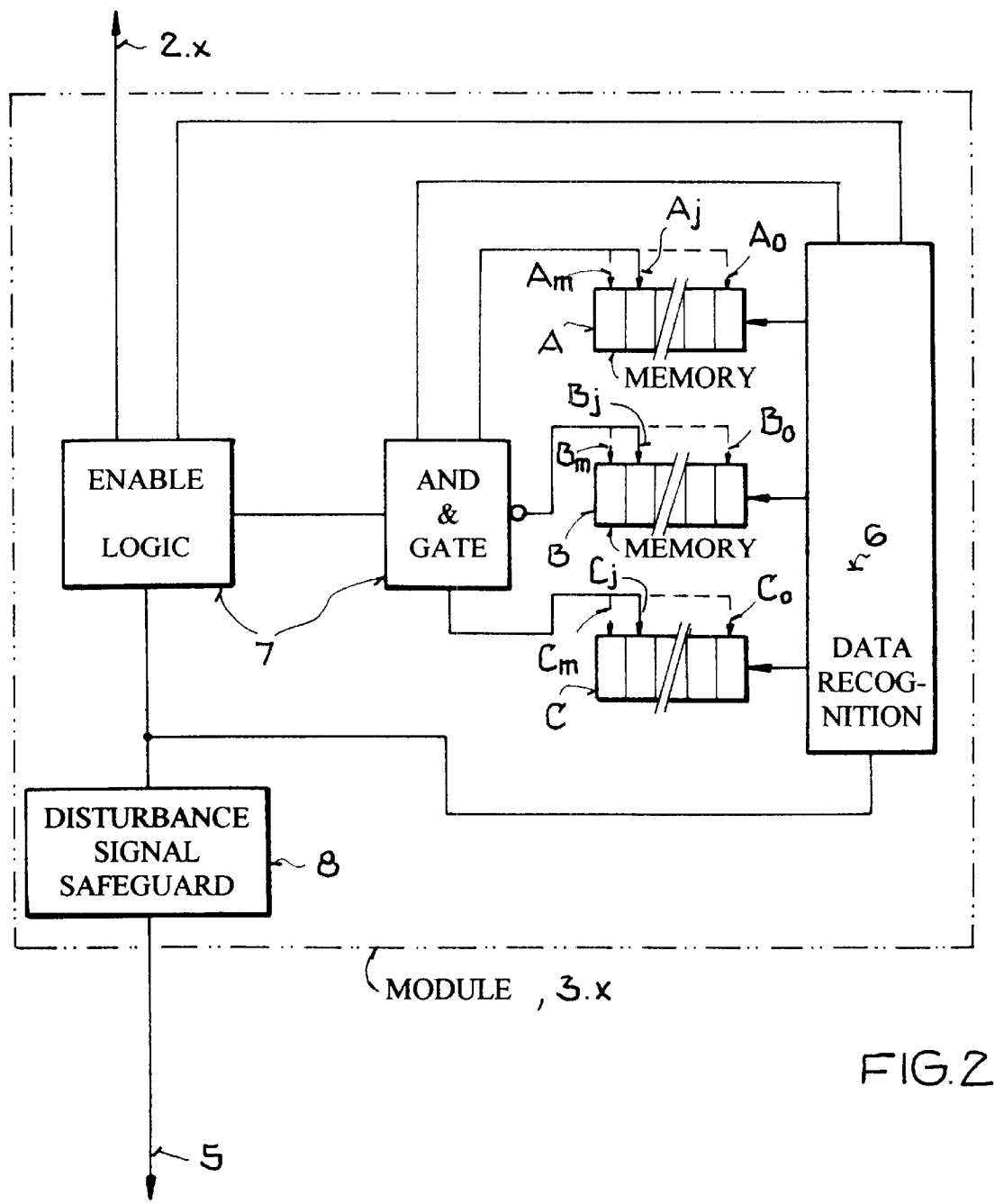
FIG. 2 shows details of a further embodiment of the module.

FIG. 2 shows an example in which the rated information is stored in a field. The module 3.x is arranged analogous to FIG.1 between the bus system 5 and the occupant protection device 2.x. In this example embodiment, the data recognition 6 addresses a memory location having three fields A, B and C that are of equal size, yet different from one another. For example, the rated information is stored in the field A in the m-bit. A blocking information is additionally stored in field B in order to effectively prevent triggering before the rated information is allocated. The respective actual informations are stored in the field C. The contents of the fields $A_j$, $B_j$, and $C_j$ are then logically combined bitwise with each other by an AND-operation for an enabling test.

The blocking information acts thereby as an additional checking or testing code for the rated information. In accordance with the negated AND-input to the enable logic 7 (ist), an enabling can occur only when, in addition to the rated and actual information, the blocking information is set accordingly. Thus, the blocking information can prevent triggering just as if there were no rated information at all stored in A. If, for example, blocking information and rated information are not set for all m-bits (o . . . j . . . m) and thus are at the initial value zero, then the occupant protection device cannot be inadvertently triggered independently of a possibly recognized actual information. If, however, the rated information and the blocking information is set appropriately, for example precisely negated, then a match between one or more bits of the actual information with the rated information will result in enablement. The individual bits $A_j$ of the rated information in A can thereby represent a respective certain accident category or type. If, for example, triggering of the particular occupant protection device is desired in the case of a frontal crash and in the case of any type of side impact, then all bits of the rated information $A_j$ would be set and the blocking information $B_j$ would be respectively occupied with zeros. Individual modules can be actually blocked, based on a particular seating occupancy state, such as an unoccupied passenger seat. This blocking can also be done by means of the blocking information in which the appropriate bits of the blocking information $B_j$ are set to 1 for the duration of this occupancy state. If an actual information is transmitted over the bus line that is characteristic, for example, of a side impact, and the appropriate bit $C_j$ is set as a result, then the module 3.x will enable the occupant protection device 2.x if the corresponding rated information $A_j$ is set and is not blocked by the blocking information $B_j$. A separate enable arrangement as shown in FIG. 1 is not necessarily required, but results from the logic linking operation in the enable logic 7.

In addition to accident categories, a threshold value can be stored in the memory location for the rated information. This is done, for example, when all bits up to $A_j$, are set to zero and all higher bits are set to 1 and the actual information is filled up with ones, beginning with $C_o$, corresponding to the actual value. In this case, too, a triggering can be prevented by the blocking information in B.

The example embodiment shown in FIG. 2 also has a disturbance interference signal safeguard 8 at the input of the module 3.x to the bus system 5. This disturbance signal safeguard 8 ensures that a module cannot be enabled by setting a distorted rated by electromagnetic or electrostatic effects (EMV, ESD). To this end, this disturbance signal safeguard 8 can be integrated into a bus signal preprocessing, for example of the bus signal, which comprises a d.c. voltage for power supply and data impulses modulated onto the voltage. Initially, the d.c. portions are split off whereby a charging or discharging of an intermediate energy storage device is performed. The a.c. portion is further processed by passing it first through a bandpass filter and then through an A/D converter. EMV or ESD disturbances, such as occur particularly during installation of the modules, are thereby filtered out and, as a result, cannot inadvertently be interpreted as a rated information. Such a disturbance signal safeguard filters all distorted data impulses out, both for the rated information and for the subsequently possibly distorted actual information.

All example embodiments shown and described, however, will always automatically exhibit the characteristic blocking against triggering when no rated information is set in A.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method for preventing a premature, accidental triggering of at least one module (3) including at least one memory location in an occupant protection system for a motor vehicle, said method comprising the following steps:

a) first entering a blocking information into said at least one memory location for preventing triggering of said at least one module until said occupant protection system has been installed in said motor vehicle, b) installing said occupant protection system in said motor vehicle, and c) second entering a rated information into said at least one memory location thereby cancelling said blocking information, whereby the same memory location is used first for temporarily storing said blocking information and then for storing said rated information after said installation is completed.

2. The method of claim 1, wherein said step of first entering is performed during manufacturing of said at least one module (3).

3. The method of claim 1, further comprising providing said at least one module (3) with a disturbance signal safeguard (8) at a bus system input of said at least one module (3).

4. The method of claim 1, further comprising providing said at least one module (3) with an address for addressing said at least one module by a central control unit in said occupant protection system, said address differing from said rated information.

5. The method of claim 1, further comprising enabling said at least one module (3) by said second entering of said rated information for responding to a predetermined relationship between actual information sensed by said occupant protection system and said rated information.

6. The method of claim 5, further comprising using as said rated information a threshold value, and wherein said actual information is a current value of a safety relevant variable.

7. The method of claim 1, further comprising using said rated information as an address information for said cancelling of said blocking information, whereby said at least one module is provided with an address, and addressing said at least one module with an actual information through said address.

* * * * *